(12) United States Patent
Chen et al.

(10) Patent No.: US 9,772,699 B2
(45) Date of Patent: Sep. 26, 2017

(54) TOUCH CONTROL SYSTEM AND TOUCH CONTROL METHOD AND COMPUTER SYSTEM OF THE SAME

(75) Inventors: Chung-Chia Chen, Taipei Hsien (TW); Wen-Chun Tsao, Taipei Hsien (TW)

(73) Assignee: Wistron Corporation, New Taipei (TW)

( * ) Notice: Subject to any disclaimer, the term of this patent is extended or adjusted under 35 U.S.C. 154(b) by 658 days.

(21) Appl. No.: 12/775,489

(22) Filed: May 7, 2010

(65) Prior Publication Data

US 2011/0175825 A1 Jul. 21, 2011

(30) Foreign Application Priority Data

Jan. 18, 2010 (TW) .............................. 99101193 A

(51) Int. Cl.
*G06F 3/041* (2006.01)
*G06F 3/038* (2013.01)
*G06F 3/0354* (2013.01)

(52) U.S. Cl.
CPC .......... *G06F 3/038* (2013.01); *G06F 3/03547* (2013.01); *G06F 3/0416* (2013.01)

(58) Field of Classification Search
CPC ....................................................... G06F 3/041
USPC ........................................................ 345/173
See application file for complete search history.

(56) References Cited

U.S. PATENT DOCUMENTS

| | | | |
|---|---|---|---|
| 5,875,311 A | 2/1999 | Bertram | |
| 5,914,702 A | 6/1999 | Derocher | |
| 6,232,957 B1 | 5/2001 | Hinckley | |
| 6,532,003 B2 * | 3/2003 | Nagao | G06F 3/045 345/168 |
| 6,983,336 B2 * | 1/2006 | Kikuchi et al. | 710/16 |
| 7,663,607 B2 * | 2/2010 | Hotelling et al. | 345/173 |
| 2009/0284479 A1 * | 11/2009 | Dennis | G06F 3/04883 345/173 |
| 2011/0109552 A1 * | 5/2011 | Yasutake | 345/163 |

FOREIGN PATENT DOCUMENTS

| | | |
|---|---|---|
| EP | 0672980 A2 | 9/1995 |
| JP | 9244798 | 9/1997 |
| TW | 403215 | 8/2000 |
| TW | 448396 | 8/2001 |

OTHER PUBLICATIONS

Office action dated May 27, 2013 for the China application No. 201010100204.4, p. 3 line 3-7 and 12-13.
Office action dated Apr. 22, 2013 for the Taiwan application No. 099101193, filing date: Jan. 18, 2010, p. 2 line 11-21 and p. 3 line 4-8 and line 11-14.

* cited by examiner

*Primary Examiner* — Larry Sternbane
*Assistant Examiner* — Mark Edwards
(74) *Attorney, Agent, or Firm* — Winston Hsu

(57) ABSTRACT

The present invention discloses a touch control system for a computer system with high compatibility. The touch control system includes an touch sensing device for detecting a touch event to generate a plurality of sensed signals conformed to a first format, and an embedded controller coupled to the touch sensing device for determining a user instruction according to the plurality of sensed signals and generating a plurality of control signals conformed to a second format to the computer system. An internal driving program in the computer system can only identify signals conformed to the second format.

12 Claims, 9 Drawing Sheets

TOUCH CONTROL SYSTEM AND TOUCH CONTROL METHOD AND COMPUTER SYSTEM OF THE SAME

BACKGROUND OF THE INVENTION

1. Field of the Invention

The present invention relates to a touch control system and related touch control method and computer system, and more particularly, to a touch control system and related touch control method and computer system with high compatibility.

2. Description of the Prior Art

Graphical user interface is an easy-to-use computer interface, which displays graphics such as windows, icons, buttons, on a screen, such that a user can select graphics via a pointing device to execute different operations. In the prior art, except for mice, touch pads are most widely used pointing devices in computer systems. The touch pads are widely used in laptops, because the touch pads can be installed in the laptops with the benefit of portability. Among all touch control methods for the touch pads, a capacitive touch technique is the most popular touch technique due to stable performance, excellent sensitivity and durability.

In general, the capacitive touch technique detects capacitive variations generated by static electricity combinations to determine a touch event when a human body touches a point on the touch panel. In other words, the capacitive touch technique realizes touch control operations by measuring the difference of capacitance after a point on the touch panel is touched. Please refer to FIG. 1, which is a schematic diagram of a conventional capacitive touch sensing device 10. The capacitive touch sensing device 10 includes sensing capacitor chains $X_1 \sim X_m$ and $Y_1 \sim Y_n$. Each sensing capacitor chain includes a plurality of sensing capacitors connected in series. The conventional touch detection method detects the capacitance of each sensing capacitor chain to determine whether a touch event occurs. If the sensing capacitor chain $X_1$ includes Q sensing capacitors, and the capacitance of each sensing capacitor is C, the capacitance of each sensing capacitor chain is QC. When the human body (e.g. a finger) touches one sensing capacitor of the sensing capacitor chain $X_1$, the capacitance variation of the sensing capacitor chain $X_1$ is $\Delta C$. If the capacitance of the sensing capacitor chain $X_1$ is (QC+$\Delta C$), the finger is touching the sensing capacitor chains $X_1$. As shown in FIG. 1, when the finger touches the touch point A ($X_3$, $Y_3$), both sensing capacitor chains $X_3$ and $Y_3$ sense the capacitance variation, such that the capacitive touch sensing device 10 can determine that the touch sensing point is ($X_3$, $Y_3$).

However, a false determination may occur in a multi-touch operation. For example, please refer to FIG. 2, which is a schematic diagram of a multi-touch operation of the capacitive touch sensing device 10. As shown in FIG. 2, since two fingers touch the capacitive touch sensing device 10 at the same time, the sensing capacitor chains $X_3$, $X_{m-1}$, $Y_3$, and $Y_{n-1}$ sense a capacitance variation at the same time as well, such that the capacitive touch sensing device 10 would determine that the touch events are occurring at ($X_3$, $Y_3$), ($X_3$, $Y_{n-1}$), ($X_{m-1}$, $Y_3$), and ($X_{m-1}$, $Y_{n-1}$). However, only the points ($X_3$, $Y_3$) and ($X_{m-1}$, $Y_{n-1}$) are touched, while the points ($X_3$, $Y_{n-1}$) and ($X_{n-1}$, $Y_3$) are not actually touched. In such a situation, the capacitive touch sensing device 10 falsely determines that the points (X3, $Y_{n-1}$) and ($X_{n-1}$, $Y_3$) are touched, causing "ghost keys". Therefore, the capacitive touch sensing device 10 can only determine at which crossing sections of the sensing capacitor chains a touch event may occur in the multi-touch operation, but can not accurately determine which points are actually touched. For the multi-touch operation, conventional touch pads operate in an absolute mode via a corresponding driving program to determine and complete user instructions. Detailed descriptions are as follows.

Please refer to FIG. 3, which are schematic diagrams of a touch pad of a computer system operating in a relative mode and an absolute mode, respectively. A left side of FIG. 3 indicates the relative mode, while a right side of FIG. 3 indicates the absolute mode. In short, in the relative mode, the touch pads simply reports a variation of touched points to an internal driving program, in order to complete the user instruction. In the absolute mode, the touch pad reports all sensed touch information to the corresponding driving program, which determines and executes the corresponding user instruction. In detail, in the relative mode, the touch pad generates sensed signals in 4-byte packets after calculating a variation of touched points. The sensed signals are transferred via an embedded controller, for reporting touch information such as a variation of touched points and whether a button is enabled ($\Delta X$, $\Delta Y$, $\Delta Z$, B) to an internal driving program, such that the system can execute the user instruction accordingly. Therefore, for the multi-touch operation, since the touch pad can not determine which point are actually touched, the touch pad can not report a variation of touched points to the internal driving program, such that the system can not executes the user instruction. In the absolute mode, the touch pad generates sensed signals in 6-byte packets according to touch information such as touched points, button status, whether the touch pad is in a multi-touch operation, pressure (X, Y, B, M, W), etc. Then, the sensed signals are reported to the corresponding driving program via the embedded controller, such that the system and the corresponding driving program can accordingly calculate a variation of touched points (such as a distance, a scroll operation), and execute the user instruction. Therefore, for the multi-touch operation, the touch pad reports the sensed signal of each touched point to the corresponding driving program via the embedded controller, and the corresponding driving program determines the corresponding user instruction, such that the system can execute the user instruction. Therefore, in the absolute mode, the touch pad can utilize the corresponding driving program to determine the user instruction in the multi-touch operation.

However, some touch pads or touch sensing devices need to operate with the corresponding driving program, or some basic or specific user instructions can not be executed, limiting application scope. In other words, when the system is not installed with the corresponding driving program, the touch pads or the touch sensing devices can not be fully utilized. For example, please refer to FIG. 4, which is a schematic diagram of an operation of a conventional touch pad 40. Under the lower left and right side dotted line areas Area_L and Area_R are a left button Pad_L and a right button Pad_R of a ordinary touch pad, respectively, and the left button Pad_L and the right button Pad_R are enabled after an external force greater than a predefined magnitude is received, such that a size of the touch pad 40 can be minimized. Under such a situation, assume that a user uses one finger to press a point A to enable the left button Pad_L, and another finger to move from a point B to a point C (i.e. a dragging operation). In the relative mode, since the touch pad senses two-point touch operation of the point A and a movement from the point B to the point C, the touch pad can not determine which points are actually touched, so as not to reported a variation of touched points to the internal driving program, such that the user instruction can not be executed; in the absolute mode, the touch pad reports all sensed information of the point A and a movement from the point B to the point C to the corresponding driving program, which determines the corresponding user instruction, such that the system can operate according to the user instruction. As can be seen from the above, the touch pads 40 needs to operate with the corresponding driving program in the absolute mode, or some basic operations inputted by the buttons can not be executed. In other words, the touch pads 40 can not operate with the internal driving program in the relative mode.

Therefore, for this type of touch pad, if an operating system of the computer is not installed with a corresponding driving program, even some basic operations inputted by the buttons can not be executed. Thus, there is a need for improvement.

SUMMARY OF THE INVENTION

It is therefore an objective of the present invention to provide a touch control system and related touch control method and computer system.

The present invention discloses a touch control system with high compatibility in a computer system. The touch control system includes a touch sensing device, for detecting a touch event, to generate a plurality of sensed signals conformed to a first format, and an embedded controller, coupled to the touch sensing device, for determining a corresponding user instruction according to the plurality of sensed signals, and generating a plurality of control signals conformed to a second format to the computer system according to the user instruction. An internal driving program the computer system can only identify signals conformed to the second format.

The present invention further discloses a touch control method for enhancing compatibility in a computer system. The touch control method includes generating a plurality of sensed signals conformed to a first format when a touch sensing device of the computer system detects a touch event, and determining a corresponding user instruction according to the plurality of sensed signals, and generating a plurality of control signals conformed to a second format to the computer system according to the user instruction. An internal driving program the computer system can only identify signals conformed to the second format.

The present invention further discloses a computer system capable of correctly determining a touch event. The computer system includes a host, for realizing functions of the computer system, and a touch control system. The touch control system includes a touch sensing device, for detecting a touch event, to generate a plurality of sensed signals conformed to a first format, and an embedded controller, coupled to the touch sensing device, for determining a corresponding user instruction according to the plurality of sensed signals, and generating a plurality of control signals conformed to a second format to the computer system according to the user instruction. An internal driving program the computer system can only identify signals conformed to the second format.

These and other objectives of the present invention will no doubt become obvious to those of ordinary skill in the art after reading the following detailed description of the preferred embodiment that is illustrated in the various figures and drawings.

DETAILED DESCRIPTION

Figure 5A:
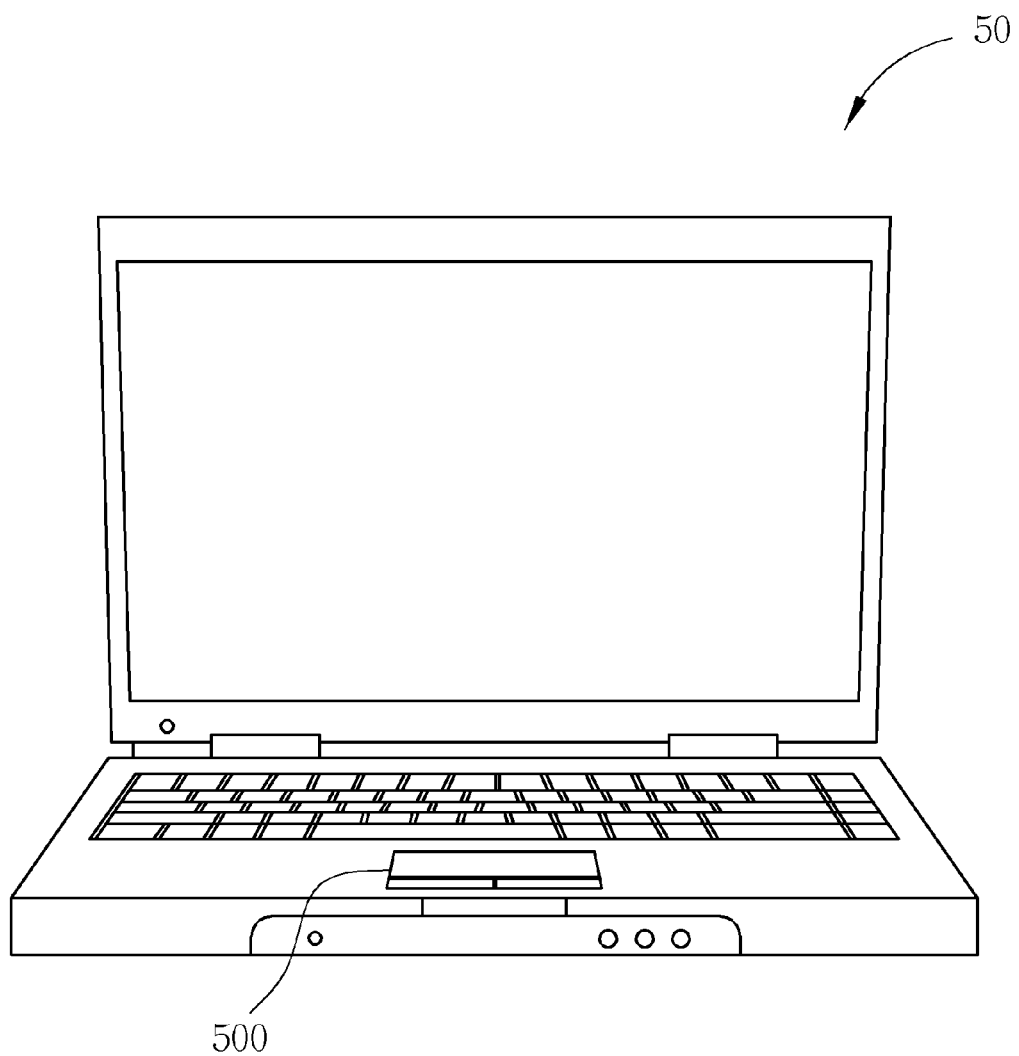
FIG. 5A is a schematic diagram of a computer system according to an embodiment of the present invention.
Figure 5B:
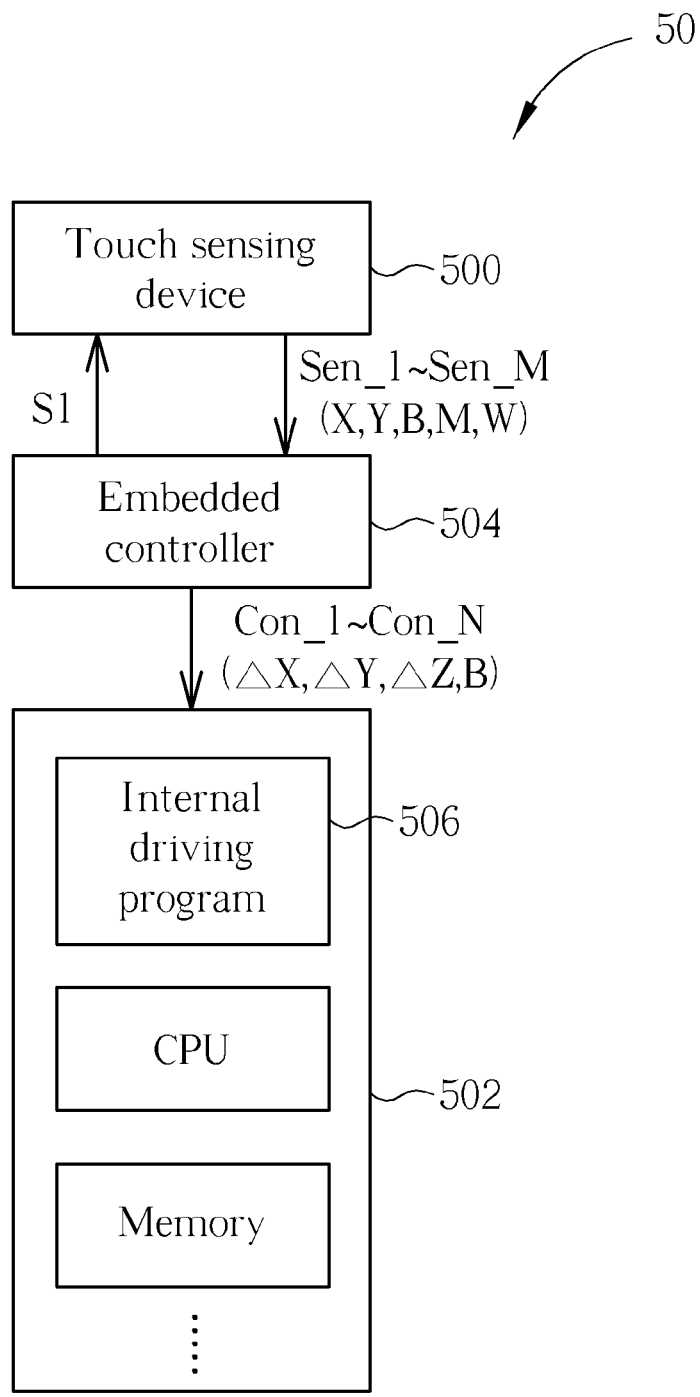
FIG. 5B is a functional block diagram of the computer system.

Please refer to FIG. 5A and FIG. 5B. FIG. 5A is a schematic diagram of a computer system 50 according to an embodiment of the present invention, and FIG. 5B is a functional block diagram of the computer system 50. As shown in FIG. 5A, the computer system 50 is preferably a laptop, which is installed with a touch sensing device 500. For clearly illustrating the spirit of the present invention, the computer system 50 can simply include the touch sensing device 500, a host 502 and an embedded controller 504 as shown in FIG. 5B. The touch sensing device 500 and the embedded controller 504 can be seen as a touch control system, whereas the touch sensing device 500 is realized by a touch pad according to the embodiment of the present invention. The touch sensing device 500 can be realized by other touch sensing devices capable of detecting a touch event, such as a touch control panel, a drawing panel, and is not limited to this. The host 502 includes an internal driving program 506, which can only identify signals in 4-byte packets. In addition, the host 502 further includes a central processing unit (CPU), a memory and other input/output devices, for realizing functions of the computer system 50, which is well known by those skilled in the art, and is not narrated hereinafter. First, the embedded controller 504 sends a start signals S1 to the touch sensing device 500, to enable the touch sensing device 500 in an absolute mode. Then, when a user touches the touch sensing device 500, the touch sensing device 500 generates sensed signals Sen_1~Sen_M in 6-byte packets according to touch information such as touched points, button status, whether the touch pad is in a multi-touch operation, pressure, etc. The embedded controller 504 determines a user instruction Cmd according to the sensed signals Sen_1~Sen_M, and generates control signals Con_1~Con_N in 4-byte packets to the host 502 according to the user instruction Cmd, such that an internal driving program 506 can execute the control signals Con_1~Con_N, to complete the user instruction Cmd. As a result, even if the computer system 50 is not installed with a corresponding driving program of the touch sensing device 500, the computer system 50 can still execute specific operations, to enhance compatibility.

In short, the touch sensing device 500 generates the sensed signals Sen_1~Sen_M in 6-byte packets after sensing the touch information. Then, the embedded controller 504 determines the user instruction Cmd corresponding to the sensed signals Sen_1~Sen_M, and generates the control signals Con_1~Con_N in 4-byte packets to the host 502 accordingly, such that the internal driving program 506 can execute the control signals Con_1~Con_N, to complete the user instruction Cmd. In other words, the touch sensing device 500 operates as in the absolute mode, for generating the sensed signals Sen_1~Sen_M in 6-byte packets according to the touch information. The embedded controller 504 acts as the corresponding driving program to determine the user instruction Cmd in 6-byte packets according to the sensed signals Sen_1~Sen_M, so as to generate the control signals Con_1~Con_N in 4-byte packets. The internal driving program 506 executes the received control signals Con_1~Con_N. As a result, even if the host 502 is not installed with a corresponding driving program of the touch sensing device 500, the host 502 can still execute specific operations, to enhance compatibility.

Figure 1:
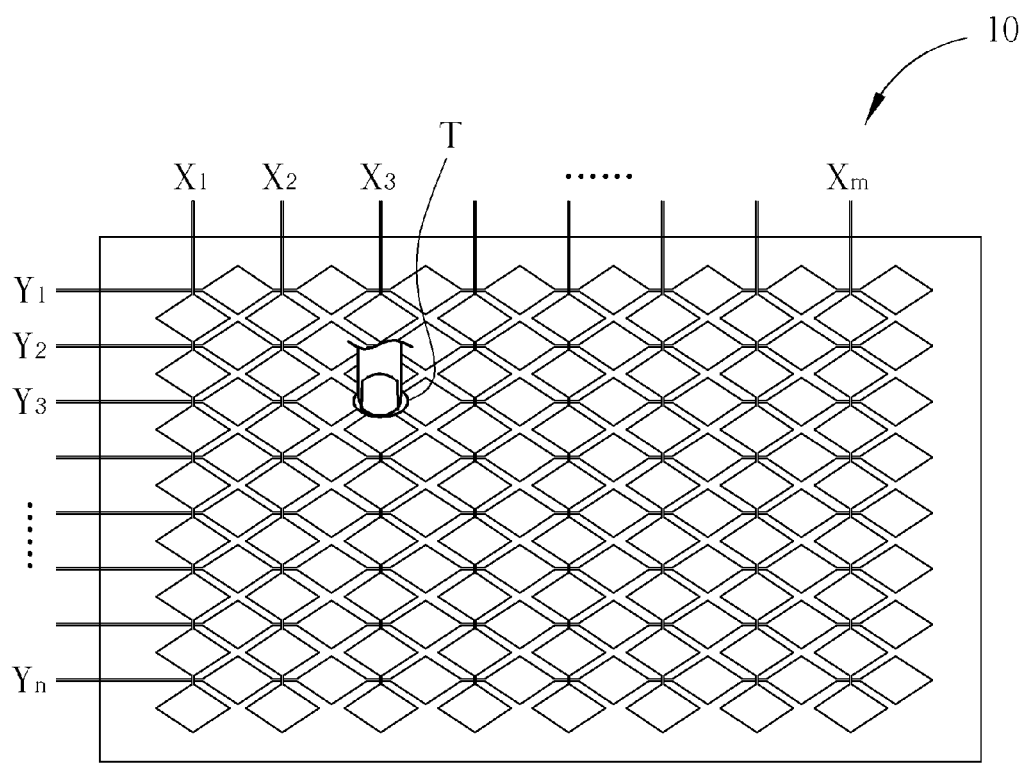
FIG. 1 is a schematic diagram of a conventional capacitive touch sensing device.
Figure 2:
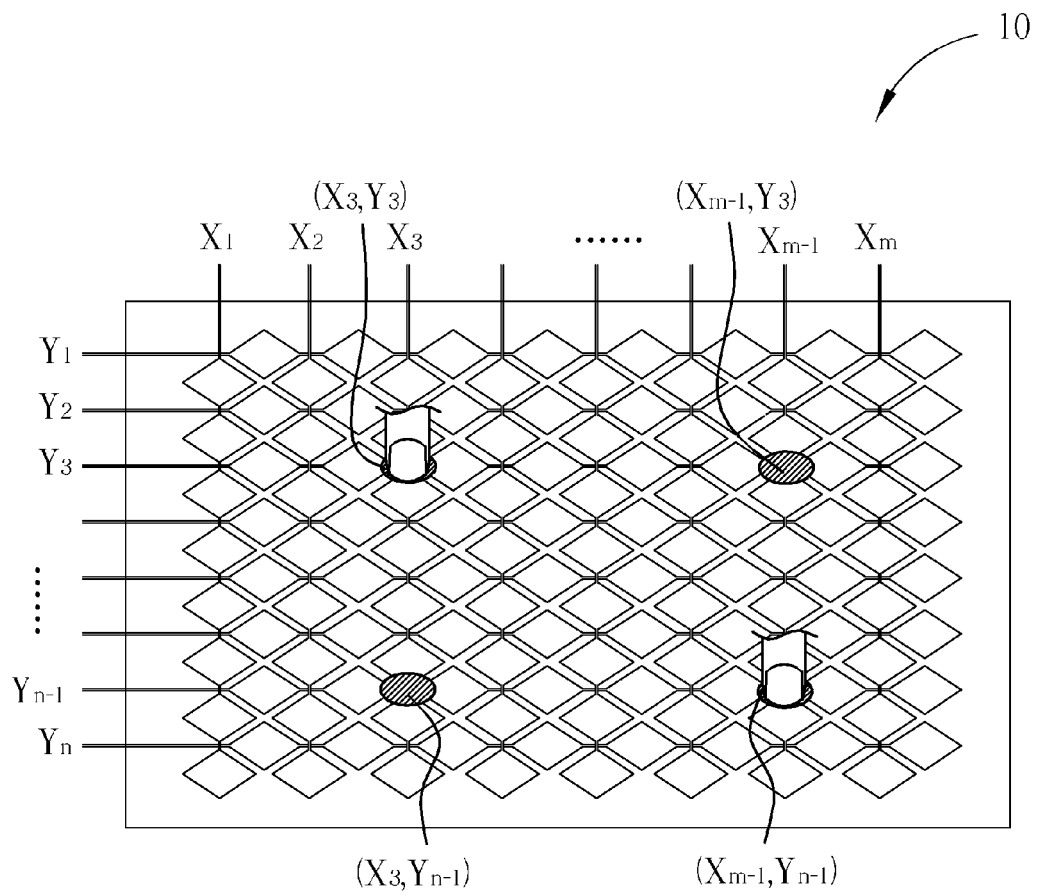
FIG. 2 is a schematic diagram of a multi-touch operation of the capacitive touch sensing device.
Figure 3:
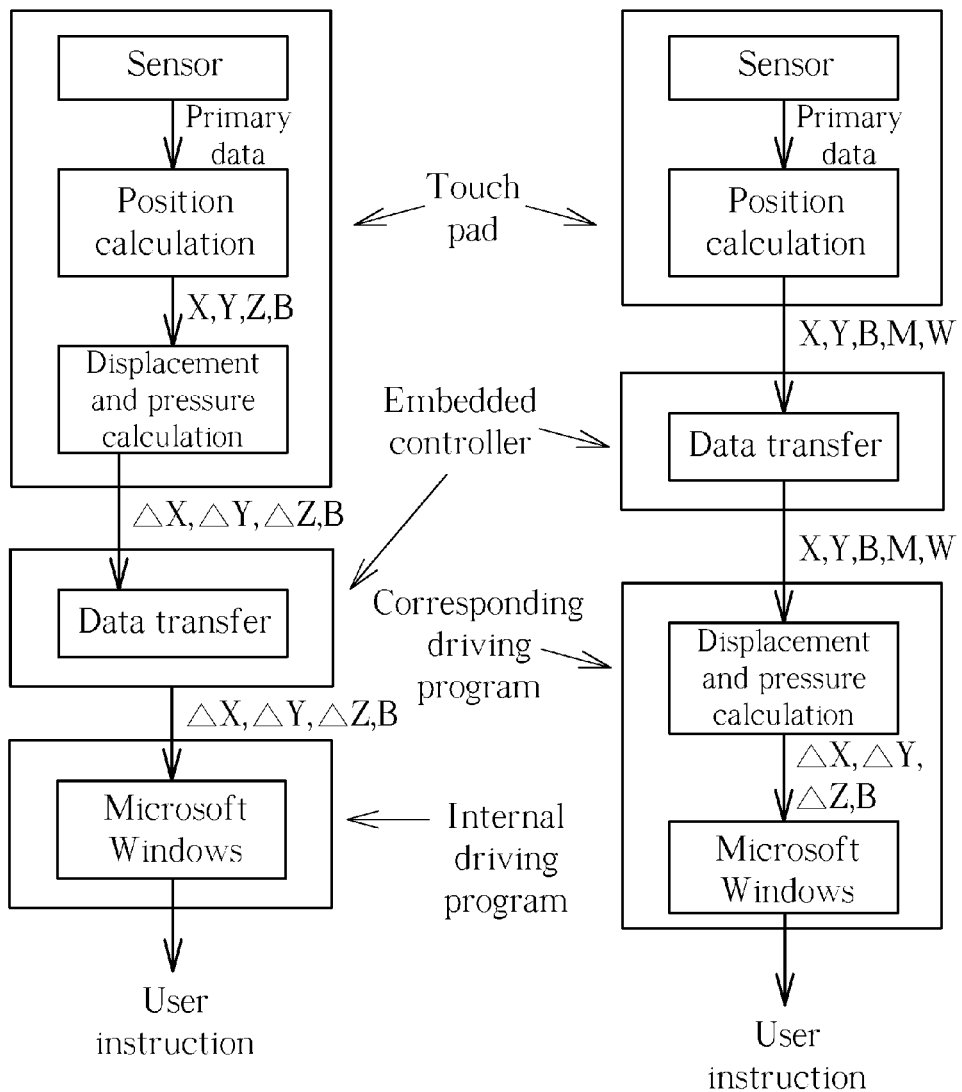
FIG. 3 are schematic diagrams of a touch pad of a computer system operating in a relative mode and an absolute mode, respectively.
Figure 4:
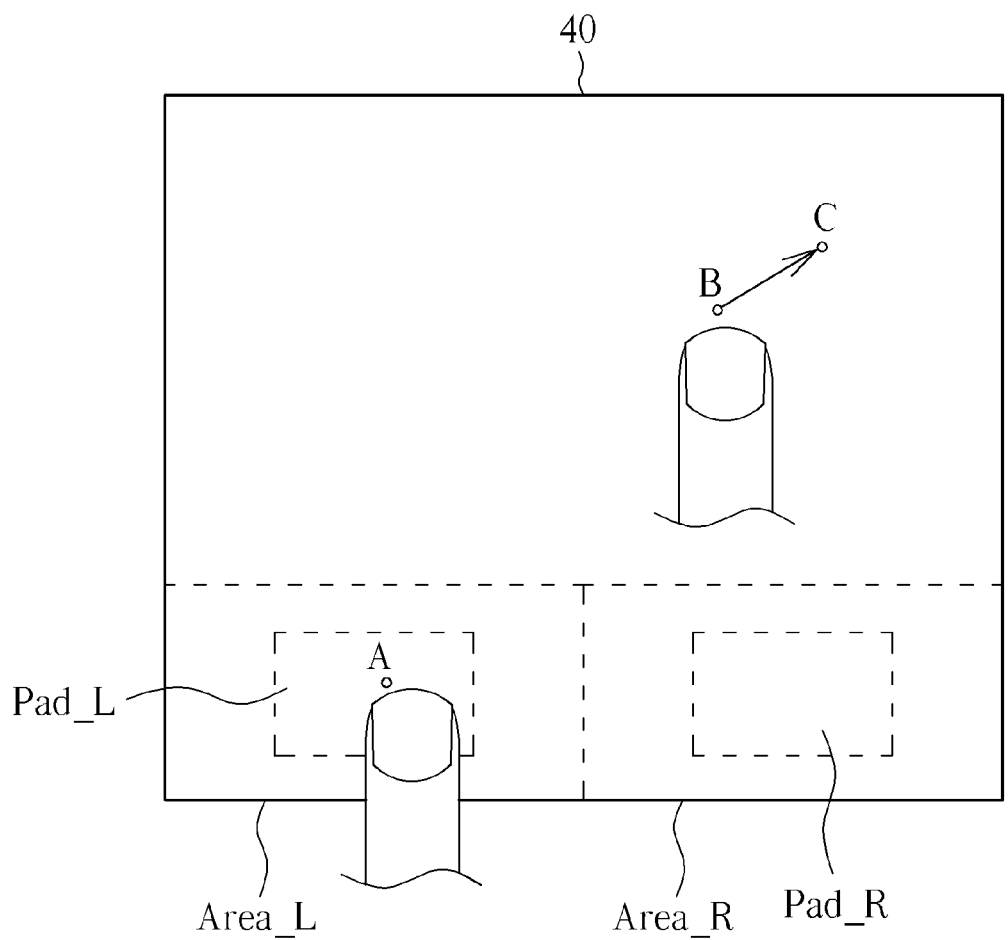
FIG. 4 is a schematic diagram of an operation of a conventional the touch pad 40.
Figure 6:
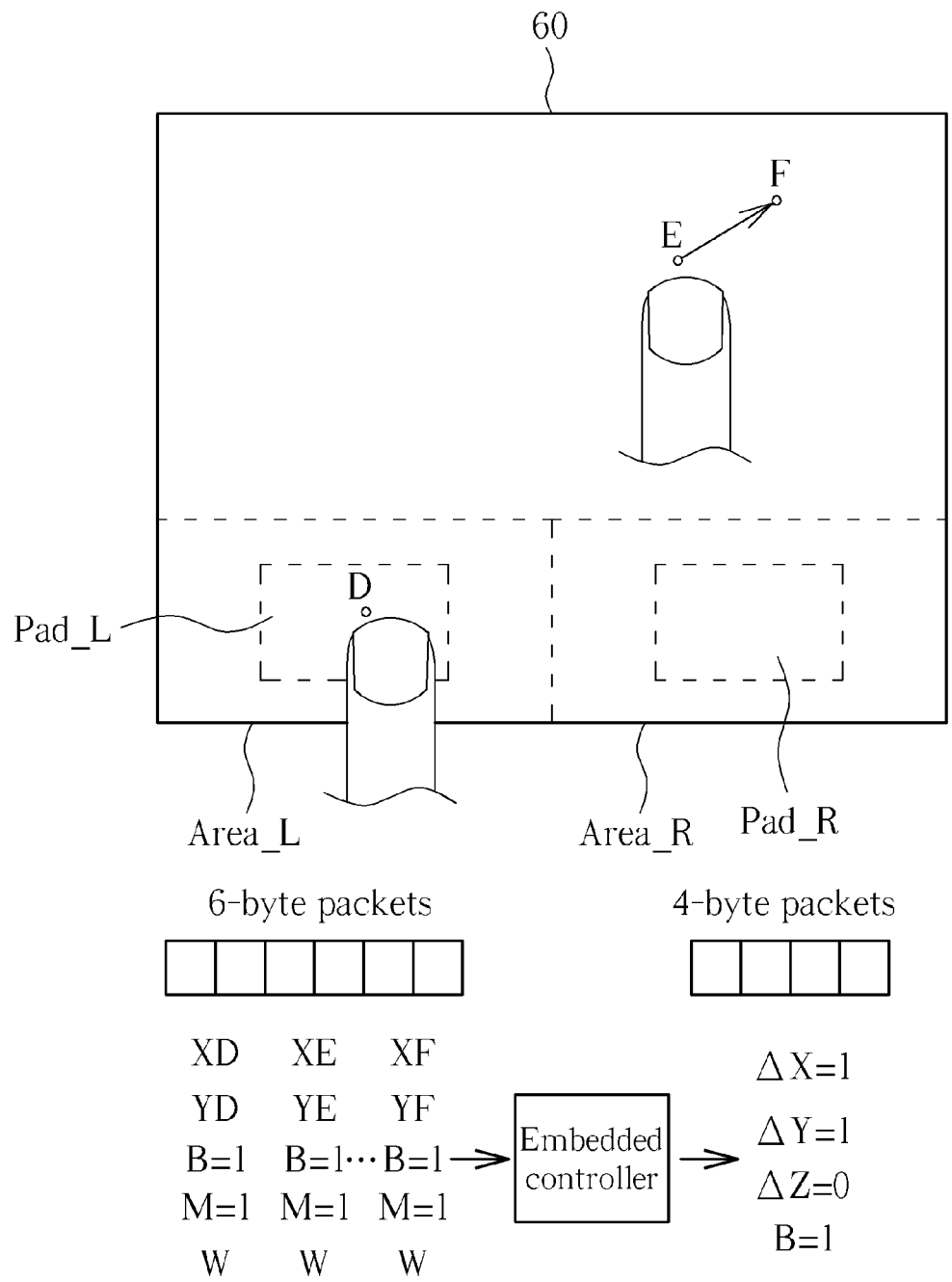
FIG. 6 is a schematic diagram of a touch pad according to an embodiment of the present invention.

If the above concept is applied in the touch pad 40 of FIG. 4, some problems in the prior art can be solved. Please refer to FIG. 6, which is a schematic diagram of a touch pad 60 according to an embodiment of the present invention. Structure and operation of the touch pad 60 are similar to those of the touch pad 40 in FIG. 4. That is, under the lower left and right dotted line areas Area_L and Area_R of the touch pad 60 are a left button Pad_L and a right button Pad_R of a ordinary touch pad, respectively, and the left button Pad_L and the right button Pad_R are enabled after an external force greater than a predefined magnitude is received, such that a size of the touch pad 60 can be minimized. In addition, the touch pad 60 is further coupled to an embedded controller (not shown in FIG. 6), whose operation is the same with that of the embedded controller 504 in FIG. 5. Therefore, when a user uses one finger to press a point D to enable the left button Pad_L, and another finger to move from a point E to a point F (i.e. a dragging operation), as shown in a lower half part of FIG. 6, the touch pad 60 transfers sensed signals in 6-byte packets indicating that a left button is enabled and the touch pad 60 is in a multi-touch operation (XD, YD, B=1, M=1, W;XE, YE, B=1, M=1, W . . . XF, YF, B=1, M=1, W) to the embedded controller. The embedded controller determines a corresponding operation is a dragging operation, and generates corresponding control signals in 4-byte packets ($\Delta X=1$, $\Delta Y=1$, $\Delta Z=0$, B=1), such that an internal driving program can execute the control signals to complete the dragging operation. As a result, even if the system is not installed with a corresponding driving program of the touch sensing device 60, the system can still execute specific operations, to enhance compatibility.

Noticeably, the spirit of the present invention is to realize operations of a corresponding driving program of a touch pad outside an operating system, to enhance compatibility, and those modifications and alterations according to the spirit of the present invention belong to the scope of the present invention. For example, an embedded controller is not limited to hardware or firmware, as long as the embedded controller can determine a user instruction corresponding to sensed signals, and generate control signals that can be identified by an internal driving program accordingly. A touch sensing device is not limited to the touch pad shown in FIG. 4, which has left and right buttons under the touch pad, as long as those touch sensing devices needs corresponding driving programs. Sensed signals transferred by a touch pad and an embedded controller are not limited to 6-byte packets, as long as the embedded controller can determine a corresponding user instruction accordingly. Operations of a corresponding driving program are not limited to ordinary operations, and some advanced operations, such as a multi-touch operation, a palm discrimination, a scroll operation, etc., can be included, as long as the embedded controller can determine a corresponding user instruction and generate control signals for an internal driving program to complete the user instruction.

Figure 7:
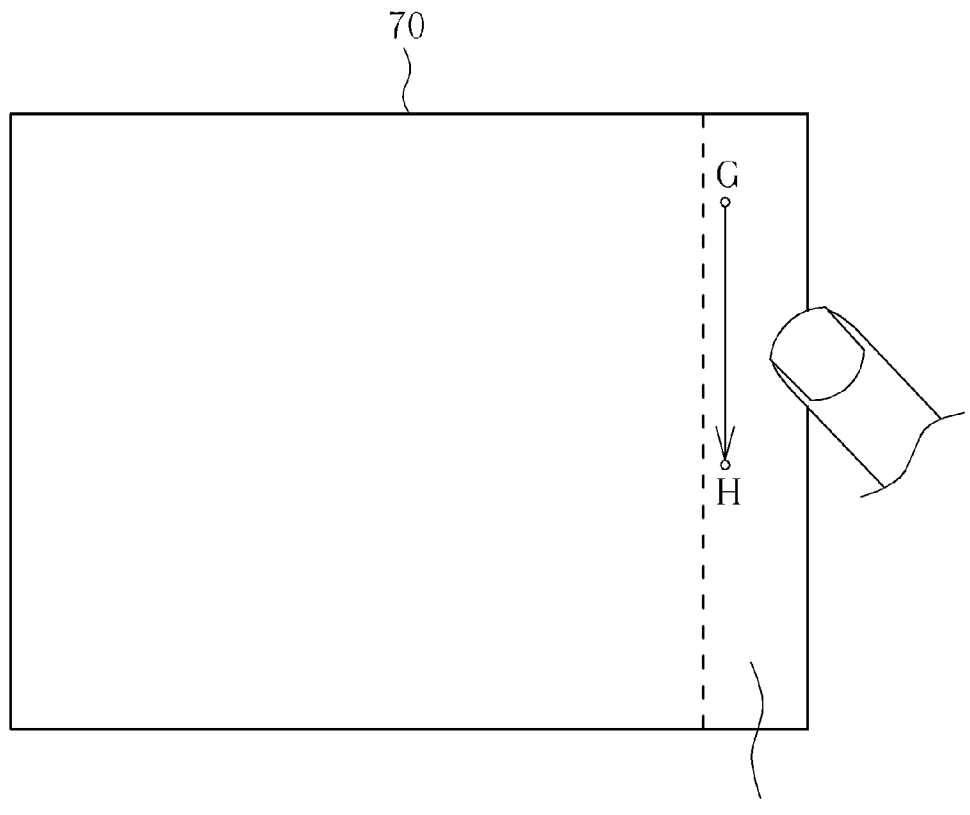
FIG. 7 is a schematic diagram of a scroll operation of a touch pad according to an embodiment of the present invention.

For example, please refer to FIG. 7, which is a schematic diagram of a scroll operation of a touch pad 70 according to an embodiment of the present invention. On a right side of the touch pad 70 is a scroll area Area_scroll, for realizing the scroll operation. In addition, the touch pad 70 is further coupled to an embedded controller (not shown in FIG. 7), which operates as the embedded controller 504 of FIG. 5. Therefore, when a user moves one finger from a point G to a point H in the scroll area Area_scroll, the touch pad 70 transfers sensed signals in 6-byte packets (XG, YG, B=1, M=1, W . . . XH, YH, B=1, M=1, W) to the embedded controller, as shown in FIG. 7, which determines that a user instruction is a scroll operation, and generates corresponding control signals in 4-byte packets ($\Delta X=0$, $\Delta Y=0$, $\Delta Z=1$, B=0), such that an internal driving program executes the control signals, to complete the scroll operation. As a result, even if the system is not installed with a corresponding driving program of the touch sensing device 70, the system can still execute specific operations, to enhance compatibility.

Figure 8:
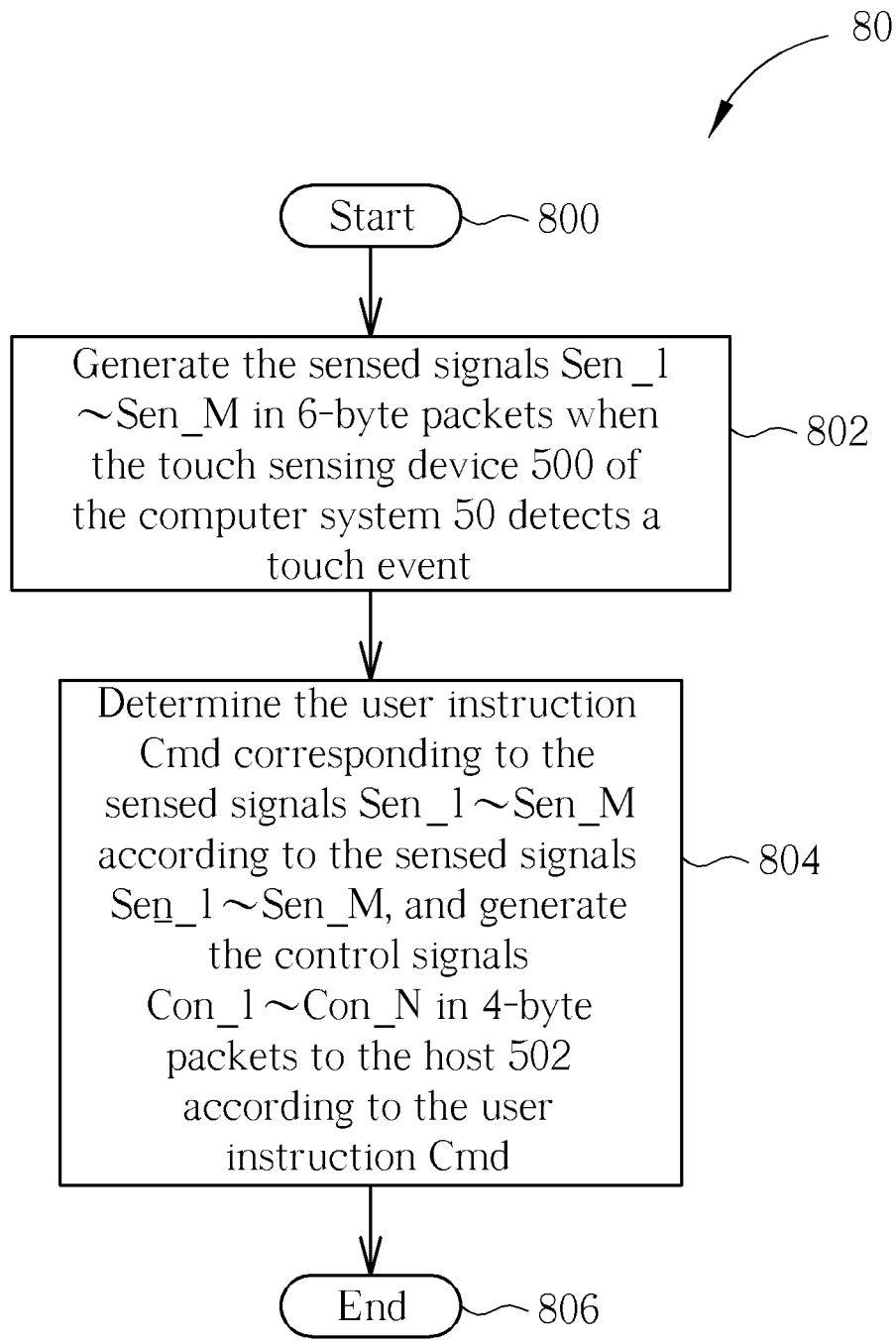
FIG. 8 is a schematic diagram of a process according to an embodiment of the present invention.

Operations of the computer system 50 can be summarized into a process 80, as shown in FIG. 8. The process 80 includes the following steps:

Step 800: Start.

Step 802: Generate the sensed signals Sen_1~Sen_M in 6-byte packets when the touch sensing device 500 of the computer system 50 detects a touch event.

Step 804: Determine the user instruction Cmd corresponding to the sensed signals Sen_1~Sen_M according to the sensed signals Sen_1~Sen_M, and generate the control signals Con_1~Con_N in 4-byte packets to the host 502 according to the user instruction Cmd.

Step 806: End.

According to process 80, the touch sensing device 500 generates the sensed signals Sen_1~Sen_M in 6-byte packets after sensing a touch event. Then, the embedded controller 504 determines the user instruction Cmd corresponding the sensed signals Sen_1~Sen_M, and generates control signals Con_1~Con_N in 4-byte packets to the host 502 accordingly, such that the internal driving program 506 can execute the control signals Con_1~Con_N, to complete the user instruction Cmd. As a result, even if the system is not installed with a corresponding driving program of the touch sensing device 500, the system can still execute specific operations, to enhance compatibility.

In the prior art, an embedded controller can only transfer signals. In comparison, an embedded controller of the present invention can determine a user instruction corresponding to sensed signals in 6-byte packets transferred by a touch sensing device, to generate control signals in 4-byte packets which can be identified by an internal driving program, such that the internal driving program can execute control signals and complete the user instruction. As a result, even if an operating system is not installed with a corresponding driving program of the touch sensing device, the system can still execute specific functions, to enhance compatibility.

To sum up, the present invention can effectively enhance compatibility, and expand application field.

Those skilled in the art will readily observe that numerous modifications and alterations of the device and method may be made while retaining the teachings of the invention.

What is claimed is:

1. A touch control system with high compatibility in a computer system, comprising:

a touch sensing device, for detecting a touch event, to generate a plurality of sensed signals conformed to a first packet format; and an embedded controller, coupled to the touch sensing device, for determining a corresponding user instruction according to the plurality of sensed signals, and then generating a plurality of control signals conformed to a second packet format to the computer system according to the user instruction;

wherein an internal driving program of the computer system can only identify signals conformed to the second packet format, and the second packet format is different from the first packet format;

wherein the first packet format is a 6-byte packet and the second packet format is a 4-byte packet.

2. The touch control system of claim 1, wherein the touch sensing device starts generating sensed signals conformed to the first packet format after receiving a start signal.

3. The touch control system of claim 1, wherein a touch control area of the touch sensing device is utilized for detecting touch events, and enables a button when receiving an external force greater than a predefined magnitude.

4. The touch control system of claim 1, wherein the user instruction is corresponding to a scroll operation or a two-point touch operation.

5. A touch control method for enhancing compatibility in a computer system, comprising:

generating a plurality of sensed signals conformed to a first packet format when a touch sensing device of the computer system detects a touch event; and determining a corresponding user instruction according to the plurality of sensed signals, and then generating a plurality of control signals conformed to a second packet format to the computer system according to the user instruction;

wherein an internal driving program of the computer system can only identify signals conformed to the second packet format, and the second packet format is different from the first packet format;

wherein the first packet format is a 6-byte packet and the second packet format is a 4-byte packet.

6. The touch control method of claim 5, wherein the touch sensing device starts generating sensed signals conformed to the first packet format after receiving a start signal.

7. The touch control method of claim 5, wherein a touch control area of the touch sensing device is utilized for detecting touch events, and enables a button when receiving an external force greater than a predefined magnitude.

8. The touch control method of claim 5, wherein the user instruction is corresponding to a scroll operation or a two-point touch operation.

9. A computer system capable of correctly determining a touch event, comprising:

a host, for realizing functions of the computer system; and a touch control system, comprising:

a touch sensing device, for detecting a touch event, to generate a plurality of sensed signals conformed to a first packet format; and an embedded controller, coupled to the touch sensing device, for determining a corresponding user instruction according to the plurality of sensed signals, and then generating a plurality of control signals conformed to a second packet format to the computer system according to the user instruction;

wherein an internal driving program of the computer system can only identify signals conformed to the second packet format, and the second packet format is different from the first packet format;

wherein the first packet format is a 6-byte packet and the second packet format is a 4-byte packet.

10. The computer system of claim 9, wherein the touch sensing device starts generating sensed signals conformed to the first packet format after receiving a start signal.

11. The computer system of claim 9, wherein a touch control area of the touch sensing device is utilized for detecting touch events, and enables a button when receiving an external force greater than a predefined magnitude.

12. The computer system of claim 9, wherein the user instruction is corresponding to a scroll operation or a two-point touch operation.

* * * * *